(12) United States Patent
Azuma et al.

(10) Patent No.: US 12,734,672 B2
(45) Date of Patent: Sep. 15, 2026

(54) REMOTE CONTROL SYSTEM, CONTROL METHOD FOR REMOTE CONTROL SYSTEM, AND REMOTE CONTROL PROGRAM

(71) Applicant: KAWASAKI JUKOGYO KABUSHIKI KAISHA, Kobe (JP)

(72) Inventors: Kentaro Azuma, Kobe (JP); Hitoshi Hasunuma, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 252 days.

(21) Appl. No.: 18/209,045

(22) Filed: Jun. 13, 2023

(65) Prior Publication Data

US 2023/0321812 A1 Oct. 12, 2023

Related U.S. Application Data

(63) Continuation of application No. PCT/JP2021/043261, filed on Nov. 25, 2021.

(30) Foreign Application Priority Data

Dec. 16, 2020 (JP) ................................ 2020-208542

(51) Int. Cl.
*B25J 3/00* (2006.01)
*B25J 9/16* (2006.01)
(Continued)

(52) U.S. Cl.
CPC ............... *B25J 3/00* (2013.01); *B25J 9/1689* (2013.01); *B25J 9/1697* (2013.01); *H04N 23/53* (2023.01)

(58) Field of Classification Search
CPC . B25J 3/00; B25J 9/1689; B25J 9/1697; B25J 13/025; B25J 13/085; B25J 19/023; B25J 9/00; B25J 9/16; B25J 9/161; B25J 9/1633; B25J 9/1669; B25J 11/005; B25J 11/0065; B25J 13/02; B25J 13/084;
(Continued)

(56) References Cited

U.S. PATENT DOCUMENTS

2013/0300846 A1* 11/2013 Miller .................... H04N 7/183 348/65
2018/0154518 A1* 6/2018 Rossano ................ B25J 9/1671
(Continued)

FOREIGN PATENT DOCUMENTS

JP 2015-047666 A 3/2015

*Primary Examiner* — Adam R Mott
*Assistant Examiner* — Byron Xavier Kasper
(74) *Attorney, Agent, or Firm* — Oliff PLC

(57) ABSTRACT

A remote control system includes: an operator that is operated by a user; a robot that applies a treatment to an object in accordance with an action of the operator; a contact force sensor that is disposed in the robot and detects an operating state of the robot; an imager that captures images of at least one of the robot or the object; a display that displays the captured images captured by the imager and presents the captured images to the user operating the operator; and a controller that performs action control of at least one of the robot or the operator in accordance with detection results of the contact force sensor. The controller delays the action control to reduce a lag between the action control and display timings of the captured images by the display.

13 Claims, 7 Drawing Sheets

(51) Int. Cl.

| | |
|---|---|
| ***B25J 13/02*** | (2006.01) |
| ***B25J 13/08*** | (2006.01) |
| ***B25J 19/02*** | (2006.01) |
| ***H04N 23/53*** | (2023.01) |

(58) Field of Classification Search

CPC .......... H04N 23/53; G05B 2219/39529; G05B 2219/40165; G05B 2219/40169; G05B 2219/40609; G05D 1/005

See application file for complete search history.

(56) References Cited

U.S. PATENT DOCUMENTS

2018/0357526 A1* 12/2018 Numata ................ G10L 13/027
2019/0064924 A1* 2/2019 Nocon .................... G06F 3/147
2021/0223867 A1* 7/2021 Nishigori ................ G06F 3/016

* cited by examiner

100
S2
S1
71
120
72
8
81
82
110
1
12b
12a
12
12b
12a
12b
13
11
11a
12a
12b
14
W
Z
X
10
2
21
23
22
22b
22a
22b
22b
22a
22b
3
20
Z
X
24

FIG. 2
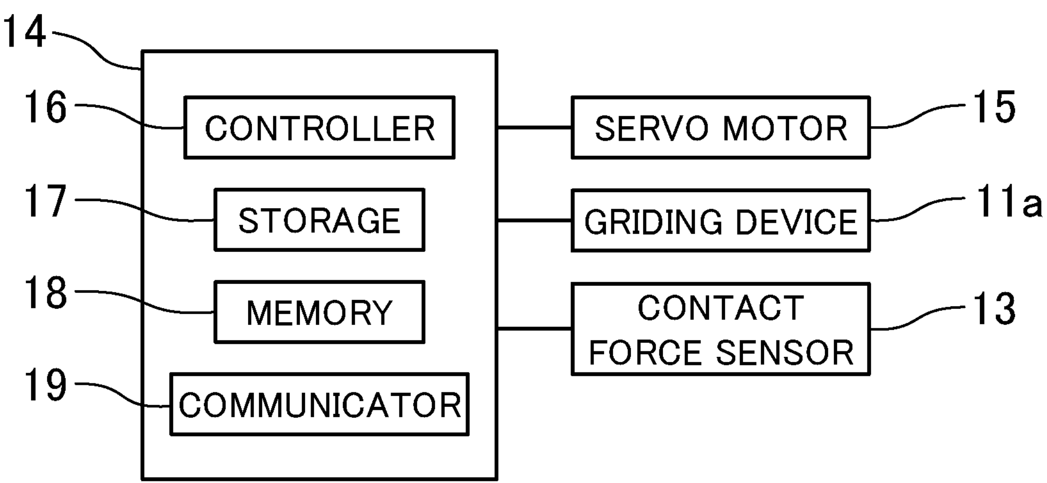
FIG. 3
24
26
CONTROLLER
27
STORAGE
28
MEMORY
SERVO MOTOR
25
OPERATING FORCE SENSOR
23
FIG. 4
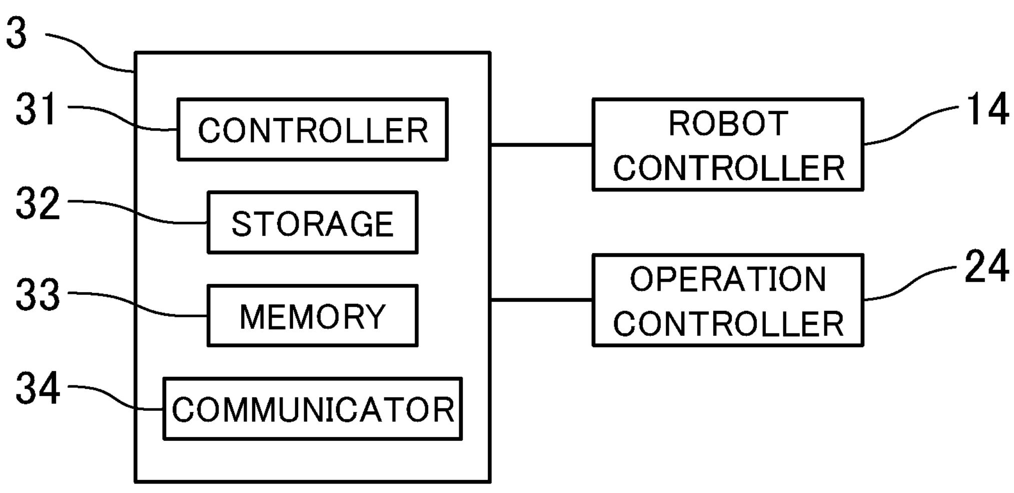

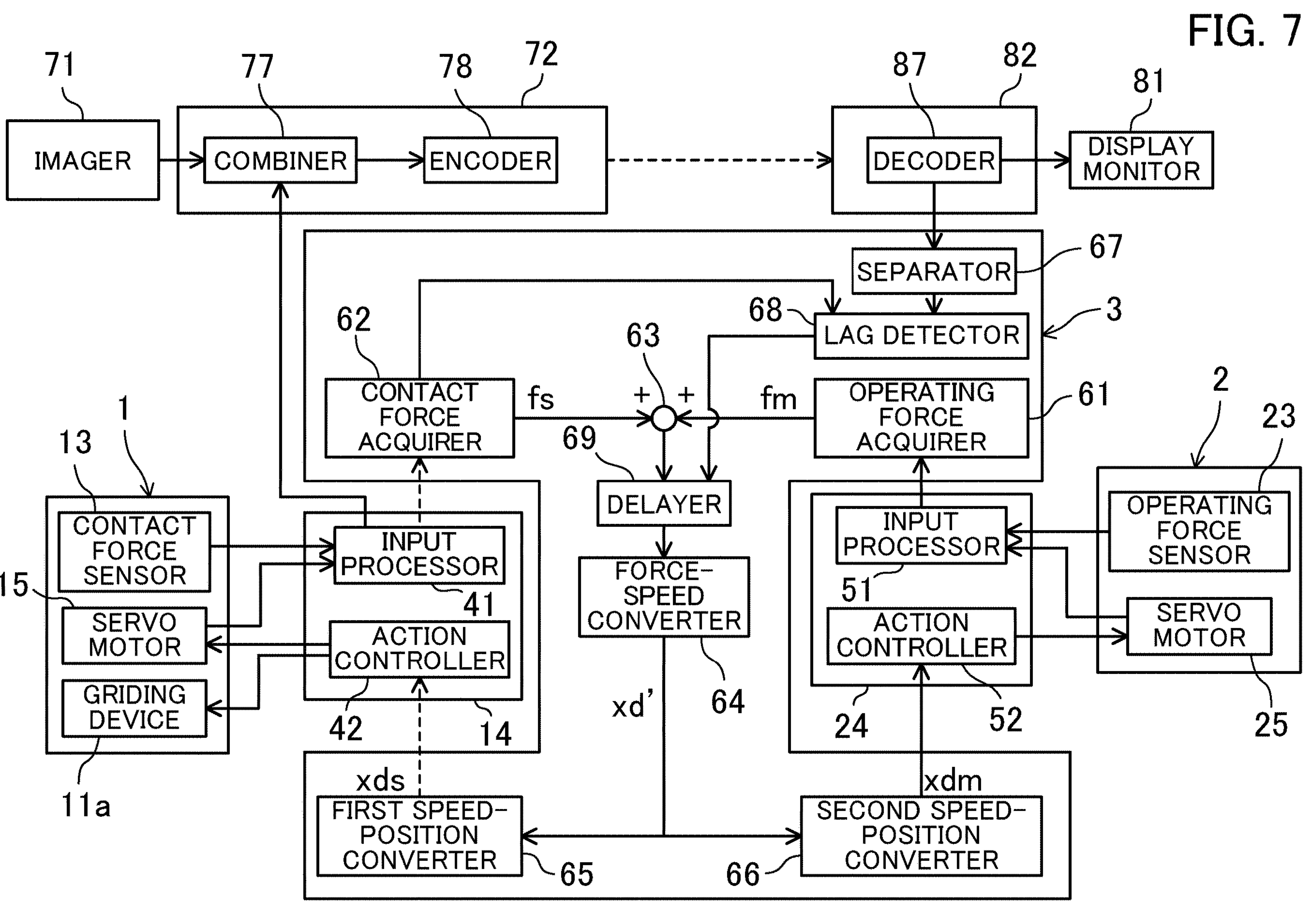
FIG. 7
71
IMAGER
77
COMBINER
78
ENCODER
72
87
DECODER
82
81
DISPLAY MONITOR
SEPARATOR
67
68
LAG DETECTOR
3
62
CONTACT FORCE ACQUIRER
fs
63
+
+
fm
OPERATING FORCE ACQUIRER
61
69
DELAYER
FORCE-SPEED CONVERTER
64
xd'
2
23
OPERATING FORCE SENSOR
SERVO MOTOR
25
INPUT PROCESSOR
51
ACTION CONTROLLER
52
24
1
13
CONTACT FORCE SENSOR
15
SERVO MOTOR
GRIDING DEVICE
11a
INPUT PROCESSOR
41
ACTION CONTROLLER
42
14
xds
FIRST SPEED-POSITION CONVERTER
65
66
SECOND SPEED-POSITION CONVERTER
xdm

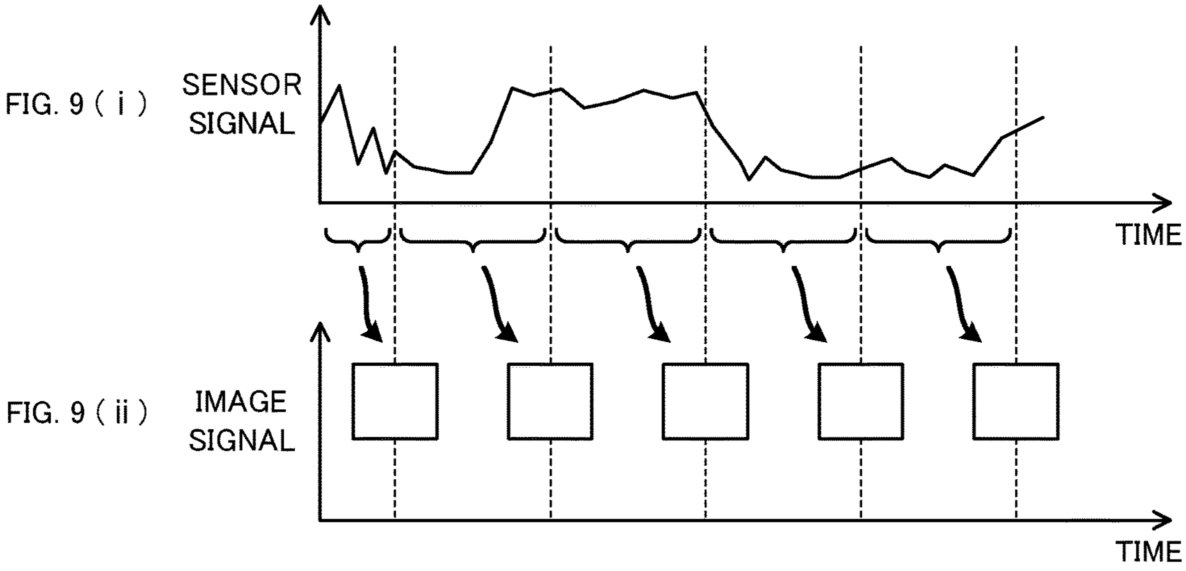
FIG. 10
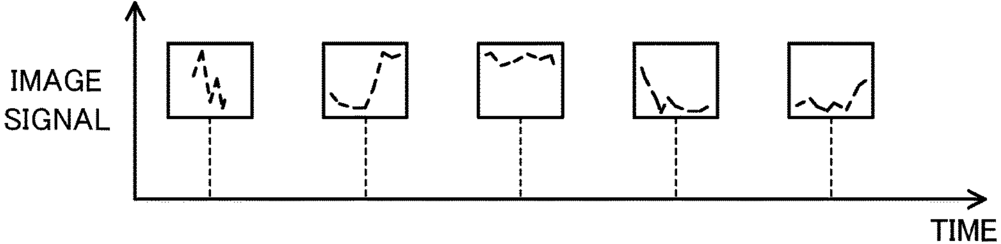

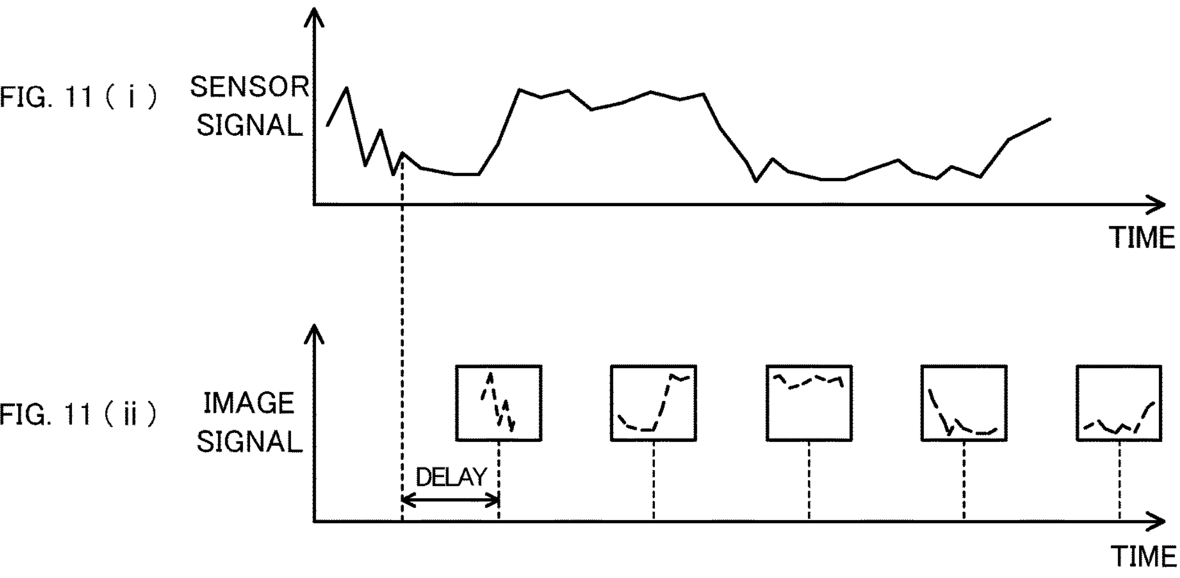
FIG. 12
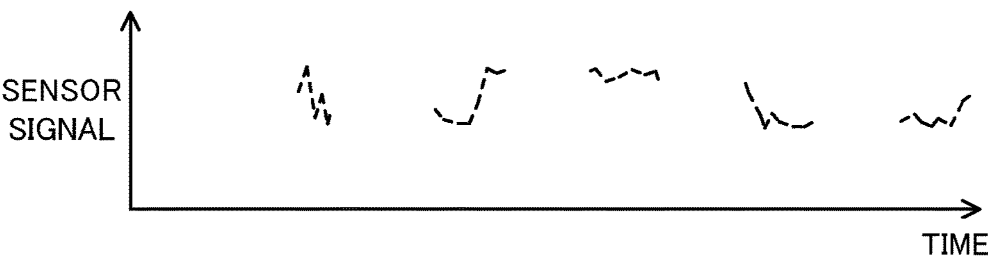

REMOTE CONTROL SYSTEM, CONTROL METHOD FOR REMOTE CONTROL SYSTEM, AND REMOTE CONTROL PROGRAM

CROSS-REFERENCE TO RELATED APPLICATION

This is a continuation of PCT International Application PCT/JP2021/043261 filed on Nov. 25, 2021 which claims priority to Japanese Patent Application No. 2020-208542 filed on Dec. 16, 2020. The disclosures of these applications including the specifications, the drawings, and the claims are hereby incorporated by reference in their entirety.

FIELD

The technique disclosed here relates to a remote control system, a control method for the remote control system, and a remote control program.

BACKGROUND

There has been a known technique for remotely controlling a slave by a master. Japanese Patent Application Publication No. 2015-47666, for example, discloses a remote control system including a master and a slave that are disposed physically separated from each other. This remote control system includes a display that displays an image transmitted from a slave side to a master side. In a case where a communication delay is large between the master and the slave, the display shows a blurred image. Accordingly, a user acknowledges that the communication delay is large.

SUMMARY

As described above, in the remote control system, various signals such as an image signal can be transmitted and received as well as a control signal between the master and the slave. The time required for signal transmission/reception and the time required for signal processing vary among signals. If a time lag occurs among signals in final signal processing, a user might feel an incongruity sense. For example, in the case of the remote control system described above, if a time lag occurs between control in the master and the slave and image display in the display, the user might feel an incongruity sense.

It is therefore an object of the technique disclosed here to reduce an incongruity sense of a user in a remote control system with display of captured images.

A remote control system disclosed here includes: a master that is operated by a user; a slave that applies a treatment to an object in accordance with an action of the master; a sensor that is disposed in the slave and detects an operating state of the slave; an imager that captures images of at least one of the slave or the object; a display that displays the captured images captured by the imager and presents the captured images to the user operating the master; and a controller that performs action control of at least one of the master or the slave based on detection results of the sensor, wherein the controller delays the action control to reduce a lag between the action control and display timings of the captured images by the display.

A control method for a remote control system disclosed here is a control method for a remote control system including a master that is operated by a user, a slave that applies a treatment to an object in accordance with an action of the master, a sensor that is disposed in the slave and detects an operating state of the slave, an imager that captures images of at least one of the slave or the object, and a display that displays the captured images captured by the imager and presents the captured images to the user operating the master, and the method includes: performing action control of at least one of the master or the slave based on detection results of the sensor; and delaying the action control to reduce a lag between the action control and display timings of the captured images by the display.

A remote control program disclosed here is a remote control program for causing a computer to execute the function of controlling a remote control system including a master that is operated by a user, a slave that applies a treatment to an object in accordance with an action of the master, a sensor that is disposed in the slave and detects an operating state of the slave, an imager that captures images of at least one of the slave or the object, and a display that displays the captured images captured by the imager and presents the captured images to the user operating the master, and the program causes the computer to execute the functions of: performing action control of at least one of the master or the slave based on detection results of the sensor; and delaying the action control to reduce a lag between the action control and display timings of the captured images by the display.

The remote control system can reduce an incongruity sense of a user in the remote control system with display of captured images.

The control method for the remote control system can reduce an incongruity sense of a user in the remote control system with display of captured images.

The remote control program can reduce an incongruity sense of a user in the remote control system with display of captured images.

BRIEF DESCRIPTION OF THE DRAWINGS

FIG. 2 is a view illustrating a schematic hardware configuration of a robot controller.

FIG. 3 is a view illustrating a schematic hardware configuration of an operation controller.

FIG. 4 is a view illustrating a schematic hardware configuration of a controller.

FIG. 7 is a block diagram illustrating a configuration of a control system of a remote control system.

FIG. 9(*i*) shows an example of a sensor signal output from an input processor.

FIG. 9(*ii*) shows an example of an image signal output from an imager.

FIG. 10 shows an example of an image signal which is output from a combiner and to which a sensor signal is added.

FIG. 11(*i*) shows an example of a sensor signal acquired by the controller from the robot controller. FIG. 11(*ii*) shows an example of an image signal decoded by the display controller.

FIG. 12 shows an example of a sensor signal separated from an image signal.

DESCRIPTION OF EMBODIMENTS

Figure 1:
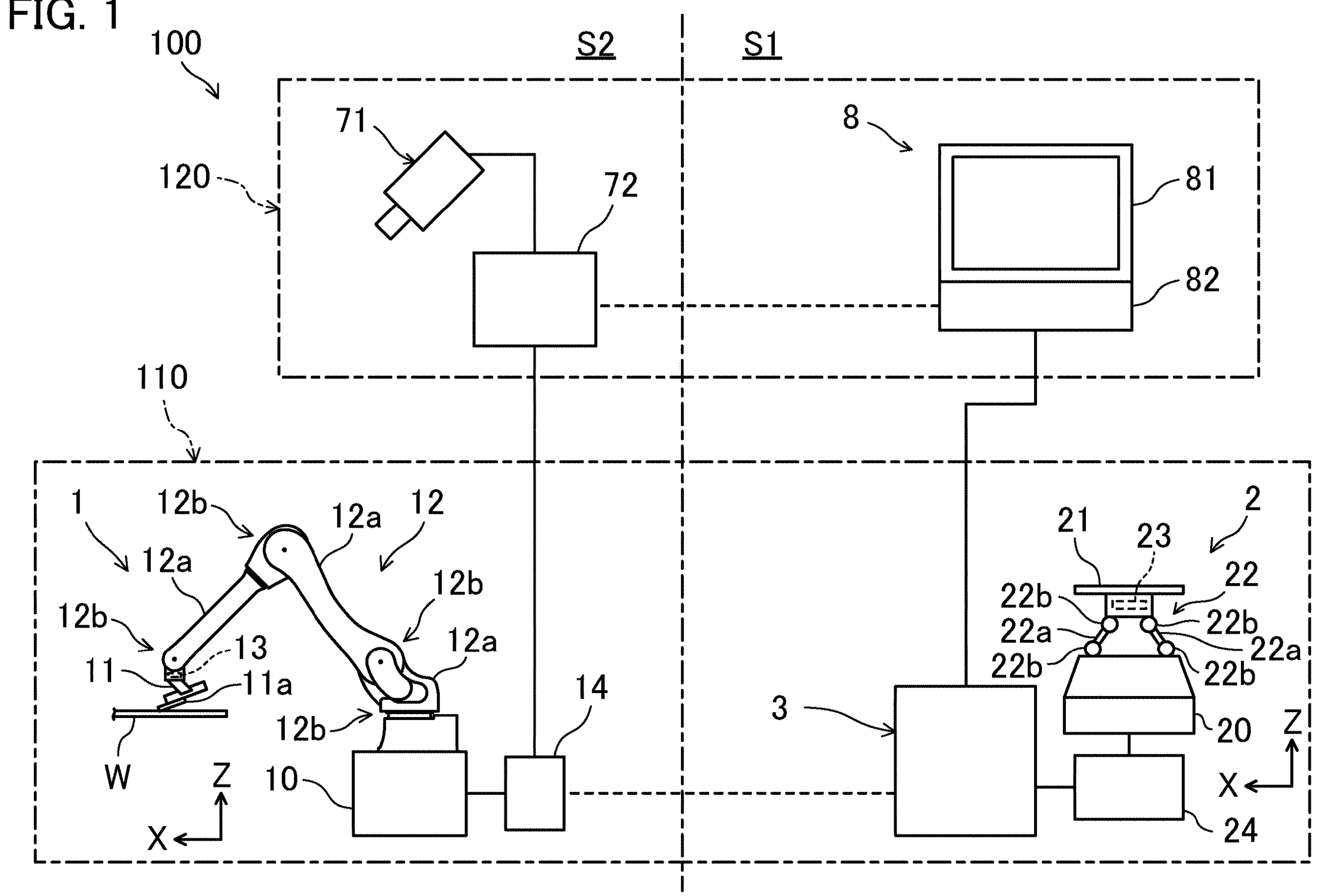
FIG. 1 is a schematic view illustrating a configuration of a remote control system according to an embodiment.

An exemplary embodiment will be described in detail hereinafter with reference to the drawings. FIG. 1 is a schematic view illustrating a configuration of a remote control system 100 according to an embodiment. In FIG. 1, broken lines represent wireless communication.

The remote control system 100 includes a master-slave system 110. The master-slave system 110 includes an operator 2 operated by a user, a robot 1 that applies a treatment to an object W in accordance with an action of the operator 2, and a controller 3 that controls the robot 1 and the operator 2. The operator 2 and the controller 3 are disposed in a first site S1. The robot 1 is disposed in a second site S2 different from the first site S1. The master-slave system 110 performs remote control between the operator 2 and the robot 1. The operator 2 is an example of a master, and the robot 1 is an example of a slave.

In this disclosure, jobs conducted by the robot 1 do not include a teaching job and confirmation and correction jobs of teaching. Thus, the operator 2 does not include a teaching pendant.

The robot 1 and the operator 2 are communicably connected to each other. Specifically, the robot 1 and the controller 3 are connected to each other to enable wireless communication. That is, a signal is transmitted and received between the robot 1 and the controller 3 through a transmission path (hereinafter referred to as a "first transmission path") including the robot 1, wireless communication, and the controller 3. The operator 2 is connected to the controller 3. That is, the operator 2 communicates with the robot 1 through the controller 3.

In this example, the robot 1 is an industrial robot. The robot 1 applies a treatment to the object W. The treatment is specifically a process, and more specifically grinding. The treatment is not limited to grinding, and may be cutting, polishing, or other processes. The object W is, for example, a large steel plate or a wall of a large tank.

The robot 1 includes a sensor that detects an operating state of the robot 1. In this example, the sensor further includes a contact force sensor 13 that detects a reaction force against the robot 1 from the object W (hereinafter referred to as a "contact force").

The controller 3 receives a detection result of the contact force sensor 13 through the robot 1. Based on the detection result of the contact force sensor 13, the controller 3 performs action control of at least one of the robot 1 or the operator 2. In this example, in accordance with operation of the operator 2 by the user and the detection result of the contact force sensor 13, the controller 3 controls an action of the robot 1 and controls an action of the operator 2 to present a reaction force exerted on the robot 1 to the user.

The remote control system 100 further includes an image system 120. The image system 120 includes an imager 71 that captures an image, and a display 8 that displays the captured image captured by the imager 71. The image system 120 further includes an image processor 72 that processes the captured image of the imager 71. The display 8 is disposed in the first site S1. The display 8 is disposed at a position at which the user can visually recognize the display 8 while operating the operator 2. The imager 71 and the image processor 72 are disposed in the second site S2. The imager 71 captures an image of the robot 1 and/or the object W.

The imager 71 and the display 8 are communicably connected to each other. Specifically, the image processor 72 and the display 8 are connected to each other to enable wireless communication. That is, a signal is transmitted and received between the imager 71 and the display 8 through a transmission path including the image processor 72, wireless communication, and the display 8 (hereinafter referred to as a "second transmission path"). The imager 71 is connected to the image processor 72. That is, the imager 71 communicates with the display 8 through the image processor 72.

In the image system 120, the image of the robot 1 and/or the object W is captured by the imager 71, and the captured image is displayed by the display 8, thereby assisting the user who operates the operator 2.

<Detailed Configuration of Remote Control System>

[Robot]

The robot 1 may include an end effector 11 that applies a treatment to an object W, and a robot arm 12 that moves the end effector 11. The robot 1 causes the robot arm 12 to operate, that is, to move, the end effector 11 so that the end effector 11 applies a treatment to the object W. The robot 1 may further include a base 10 supporting the robot arm 12, and a robot controller 14 that controls the entire robot 1.

In the robot 1, a robot coordinate system of three orthogonal axes is defined. For example, a Z axis is defined in the top-bottom directions, and an X axis and a Y axis are defined to be orthogonal to each other in the horizontal directions.

The end effector 11 includes a grinding device 11*a*, and applies grinding as a treatment to the object W. Examples of the grinding device 11*a* include a grinder, an orbital sander, a random orbit sander, a delta sander, and a belt sander. The grinder may be of a type that rotates a disc-shaped grindstone, a type that rotates a conical or columnar grindstone, or the like. The grinding device 11*a* in this example is a grinder.

The robot arm 12 changing a position of the grinding device 11*a*. The robot arm 12 may change a posture of the grinding device 11*a*. The robot arm 12 is a vertical articulated robot arm. The robot arm 12 includes links 12*a*, joints 12*b* connecting the links 12*a*, and a servo motor (see FIG. 2) that rotationally drives the joints 12*b*.

The robot arm 12 may be of a horizontal articulated type, a parallel link type, a Cartesian coordinate type, a polar coordinate type, or other types.

In this example, the contact force sensor 13 is located between the robot arm 12 and the end effector 11 (specifically, in a coupling part between the robot arm 12 and the end effector 11). The contact force sensor 13 detects a contact force received by the end effector 11 from the object W. The contact force sensor 13 detects forces along three orthogonal axes and moments around the three axes. The contact force sensor 13 is an example of a force sensor.

The force sensor is not limited to the contact force sensor 13. For example, the contact force sensor 13 may detect only forces in uniaxial, biaxial, or triaxial directions. Alternatively, the force sensor may be a sensor such as a current sensor that detects a current of the servo motor 15 of the robot arm 12 or a torque sensor that detects a torque of the servo motor 15.

FIG. 2 illustrates a schematic hardware configuration of the robot controller 14. The robot controller 14 controls the servo motor 15 of the robot arm 12 and the grinding device 11*a*. The robot controller 14 receives a detection signal of the contact force sensor 13. The robot controller 14 transmits and receives information, instructions, data, and others to/from the controller 3 and the image processor 72. The robot controller 14 performs wireless communication with the controller 3. The robot controller 14 is wirelessly connected to the image processor 72, and transmits information, data, and so forth to the image processor 72 through wires. The robot controller 14 includes a controller 16, a storage 17, a memory 18, and a communicator 19.

The controller 16 controls the entire robot controller 14. The controller 16 performs various computations. For example, the controller 16 is a processor such as a central processing unit (CPU). The controller 16 may be a micro controller unit (MCU), a micro processor unit (MPU), a field programmable gate array (FPGA), a programmable logic controller (PLC), a system LSI, or the like.

The storage 17 stores programs and various types of data to be executed by the controller 16. The storage 17 is a nonvolatile memory, a hard disc drive (HDD), or a solid state drive (SSD), for example.

The memory 18 temporarily stores data or other information. For example, the memory 18 is a volatile memory.

The communicator 19 is a communication module and performs wireless communication. For example, the communicator 19 achieves wireless communication conforming to the communication standard of 5G.

[Operator]

As illustrated in FIG. 1, the operator 2 includes a handle 21 that is operated by a user and an operating force sensor 23 that detects an operating force exerted on the handle 21 by a user. The operator 2 receives an input for manually operating the robot 1, and outputs operation information that is input information to the controller 3. Specifically, the user operates the operator 2 while holding the handle 21. A force exerted on the handle 21 at this time is detected by the operating force sensor 23. The operating force detected by the operating force sensor 23 is output to the controller 3 as operation information.

The operator 2 may further include a base 20, a support 22 that is disposed on the base 20 and supports the handle 21, and an operation controller 24 that controls the entire operator 2. The operator 2 presents a reaction force against the operating force to the user by control from the controller 3. Specifically, in response to an instruction from the controller 3, the operation controller 24 controls the support 22 to cause the user to sense the reaction force.

In the operator 2, an operation coordinate system of three orthogonal axes is defined. The operation coordinate system corresponds to a robot coordinate system. That is, the Z axis is defined in the top-bottom directions, and the X axis and the Y axis are defined to be orthogonal to each other in the horizontal directions.

The support 22 includes links 22*a*, joints 22*b* connecting the links 22*a*, and a servo motor 25 (see FIG. 3) that rotationally drives the joints 22*b*. The support 22 supports the handle 21 such that the handle 21 can take any position and any posture in three-dimensional space. In accordance with the position and posture of the handle 21, the servo motor 25 rotates. The amount of rotation, that is, the rotation angle, of the servo motor 25 is uniquely determined.

In this example, the operating force sensor 23 is located between the handle 21 and the support 22 (specifically, in a coupling part between the handle 21 and the support 22). The operating force sensor 23 detects forces along three orthogonal axes and moments around the three axes.

The detector of an operating force is not limited to the operating force sensor 23. For example, the operating force sensor 23 may detect only forces in uniaxial, biaxial, or triaxial directions. Alternatively, the detector may be a sensor such as a current sensor that detects a current of the servo motor 25 of the support 22 or a torque sensor that detects a torque of the servo motor 25.

FIG. 3 illustrates a schematic hardware configuration of the operation controller 24. The operation controller 24 operates the support 22 by controlling the servo motor 25. The operation controller 24 receives a detection signal of the operating force sensor 23. The operation controller 24 is connected to the controller 3 by wires and transmits and receives information, instructions, data, and others to/from the controller 3 through the wires. The operation controller 24 includes the controller 26, the storage 27, and the memory 28.

The controller 26 controls the entire operation controller 24. The controller 26 performs various computations. For example, the controller 26 is a processor such as a central processing unit (CPU). The controller 26 may be a micro controller unit (MCU), a micro processor unit (MPU), a field programmable gate array (FPGA), a programmable logic controller (PLC), system LSI, or the like.

The storage 27 stores programs and various types of data to be executed by the controller 26. The storage 27 is a nonvolatile memory, a hard disc drive (HDD), or a solid state drive (SSD), for example.

The memory 28 temporarily stores data or other information. For example, the memory 28 is a volatile memory.

[Controller]

The controller 3 controls the entire master-slave system 110, and controls actions of the robot 1 and the operator 2. Specifically, the controller 3 performs master-slave control, specifically, bilateral control, between the robot 1 and the operator 2. The controller 3 performs first control of controlling an action of the robot 1 in accordance with an action of the operator 2 by user's operation, and second control of controlling an action of the operator 2 such that a reaction force in accordance with a detection result of the contact force sensor 13 is presented to the user. That is, the end effector 11 processes the object W by the first control, and a reaction force in the process is presented to the user by the second control.

FIG. 4 illustrates a schematic hardware configuration of the controller 3. The controller 3 transmits and receives information, instructions, data, and others to/from the robot controller 14 and the operation controller 24. The controller 3 also transmits and receives information, an instruction, data, and others to/from the display 8. The controller 3 includes a controller 31, a storage 32, a memory 33, and a communicator 34. Although not shown, the controller 3 may further include an input operator that is operated by the user to set action control of the robot 1 and the operator 2, and a display monitor that displays contents of the setting.

The controller 31 controls the entire controller 3. The controller 31 performs various computations. For example, the controller 31 is a processor such as a central processing unit (CPU). The controller 31 may be a micro controller unit (MCU), a micro processor unit (MPU), a field programmable gate array (FPGA), a programmable logic controller (PLC), system LSI, or the like.

The storage 32 stores programs and various types of data to be executed by the controller 31. For example, the storage 32 stores a remote control program for controlling the remote control system 100. The storage 32 is, for example, a nonvolatile memory, a hard disc drive (HDD), a solid state drive (SSD), or other types of devices.

The memory 33 temporarily stores data or other information. For example, the memory 33 is a volatile memory.

The communicator 34 is a communication module and performs wireless communication. For example, the communicator 34 achieves wireless communication conforming to the communication standard of 5G.

[Imager and Image Processor]

The imager 71 captures images, specifically, moving images, of the robot 1 and the object W. In this example, since the robot 1 performs grinding on the object W, the imager 71 captures images mainly of the end effector 11 and the object W. The imager 71 captures a moving image in a predetermined frame rate. The captured images of the imager 71 are input to the image processor 72 as image signals.

The image processor 72 receives the captured images, that is, the image signals, from the imager 71, processes the image signals, and transmits the processed image signals to the display 8. The image processor 72 encodes the processed image signals, and transmits the encoded image signals to the display 8 by wireless communication.

Specifically, the image processor 72 receives a detection result of the contact force sensor 13 from the robot 1 in addition to the image signal of the imager 71. As processing of a captured image, the image processor 72 associates a captured image of the imager 71 and a detection result of the contact force sensor 13 acquired at corresponding timings with each other. Specifically, the image processor 72 adds the detection result of the contact force sensor 13 acquired at the timing corresponding to the captured image, to the captured image. The image processor 72 encodes the captured image to which the detection result of the contact force sensor 13 is added, and transmits the encoded captured image to the display 8.

Figure 5:
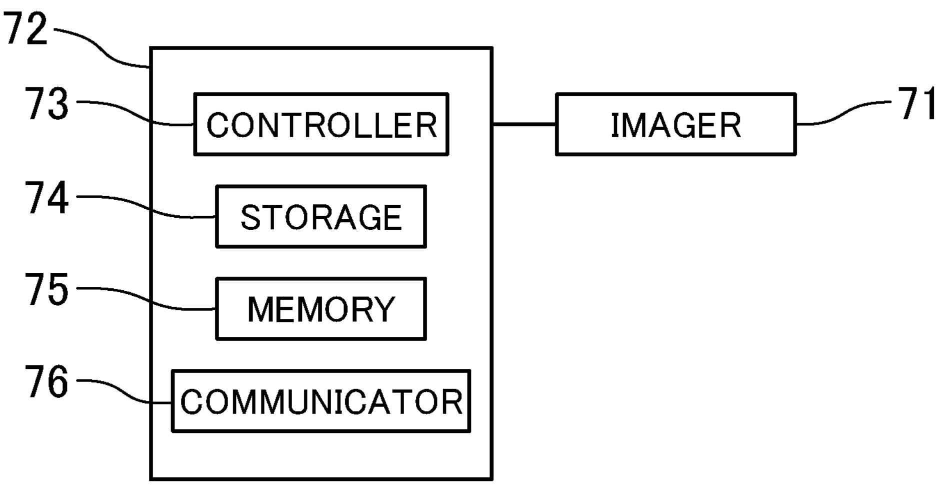
FIG. 5 is a view illustrating a schematic hardware configuration of an image processor.

FIG. 5 us a view illustrating a schematic hardware configuration of the image processor 72. The image processor 72 includes a controller 73, a storage 74, a memory 75, and a communicator 76.

The controller 73 controls the entire image processor 72. The controller 73 performs various computation processes. For example, the controller 73 is a processor such as a central processing unit (CPU). The controller 73 may be a micro controller unit (MCU), a micro processor unit (MPU), a field programmable gate array (FPGA), a programmable logic controller (PLC), a system LSI, or the like.

The storage 74 stores programs and various types of data to be executed by the controller 73. The storage 74 is, for example, a nonvolatile memory, a hard disc drive (HDD), a solid state drive (SSD), or other types of devices.

The memory 75 temporarily stores data or the like. For example, the memory 75 is a volatile memory.

The communicator 76 is a communication module and performs wireless communication. For example, the communicator 76 achieves wireless communication conforming to the communication standard of 5G.

[Display]

The display 8 displays a captured image of the imager 71. The display monitor 8 includes a display monitor 81 and a display controller 82.

The display controller 82 receives the captured image of the imager 71 by wireless communication. Specifically, the display controller 82 performs wireless communication with the image processor 72. The display controller 82 receives an image signal from the image processor 72. The display controller 82 decodes the received image signal and outputs the decoded image signal to the display monitor 81.

The display monitor 81 displays, as an image, the image signal input from the display controller 82.

Figure 6:
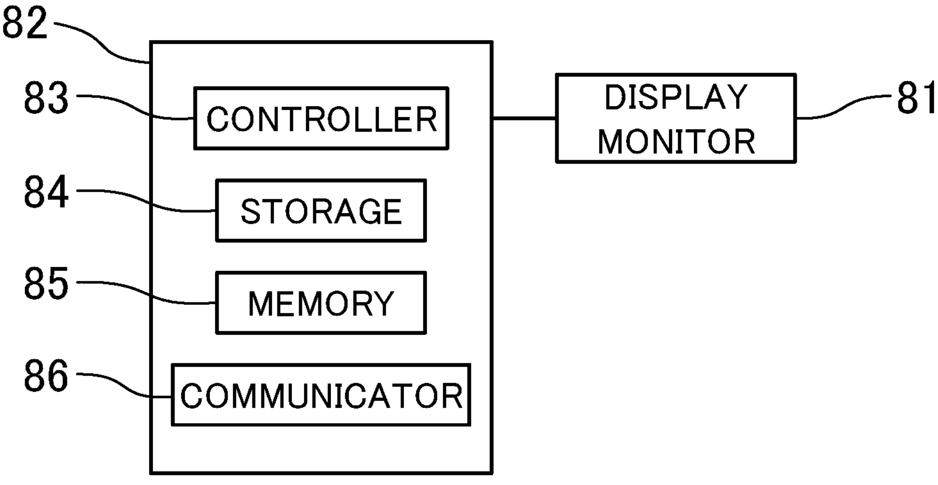
FIG. 6 is a view illustrating a schematic hardware configuration of a display controller.

FIG. 6 is a view illustrating a schematic hardware configuration of the display control device 82. The display controller 82 includes a controller 83, a storage 84, a memory 85, and a communicator 86.

The controller 83 controls the entire display controller 82. The controller 83 performs various computation processes. For example, the controller 83 is a processor such as a central processing unit (CPU). The controller 83 may be a micro controller unit (MCU), a micro processor unit (MPU), a field programmable gate array (FPGA), a programmable logic controller (PLC), a system LSI, or the like.

The storage 84 stores programs and various types of data to be executed by the controller 83. The storage 84 is, for example, a nonvolatile memory, a hard disc drive (HDD), a solid state drive (SSD), or other types of devices.

The memory 85 temporarily stores data or the like. For example, the memory 85 is a volatile memory.

The communicator 86 is a communication module and performs wireless communication. For example, the communicator 86 achieves wireless communication conforming to the communication standard of 5G.

<Control of Remote Control System>

In the thus-configured remote control system 100, the controller 3 performs master-slave control in which first control of controlling an action of the robot 1 in accordance with an action of the operator 2 by user's operation and second control of controlling an action of the operator 2 such that a reaction force in accordance with a detection result of the contact force sensor 13 is presented to the user are performed in parallel. Simultaneously, the image system 120 performs image display control in which the imager 71 captures images of the robot 1 and the object W and the display 8 displays the captured images. The user can operate the operator 2 while observing the captured images shown by the display 8. At this time, the controller 3 performs delay control of delaying the master-slave control to reduce a lag between master-slave control and the captured images shown by the display 8.

In addition, while the master-slave control and the image display control are performed, the controller 3 obtains a time lag between the master-slave control and the captured images shown by the display 8 and updates the amount of delay in the delay control based on the time lag.

FIG. 7 is a block diagram illustrating a configuration of a control system of the remote control system 100.

The controller 16 of the robot controller 14 reads programs from the storage 17 and develops the programs to the memory 18 to thereby operate various functions. Specifically, the controller 16 functions as an input processor 41 and an action controller 42.

The input processor 41 outputs information, data, instructions, and others received from the contact force sensor 13 and the servo motor 15 to the controller 3. Specifically, the input processor 41 receives detection signals of forces in six axes (hereinafter referred to as "sensor signals") from the contact force sensor 13 and outputs the detection signals to the controller 3. The sensor signal is transmitted to the controller 3 by wireless communication. The input processor 41 receives detection signals of a rotation sensor (e.g., encoder) and a current sensor from the servo motor 15. The input processor 41 outputs the detection signals to the action controller 42 for feedback control of the robot arm 12 by the action controller 42. The input processor 41 outputs the detection signals as positional information of the robot arm 12 to the controller 3. The input processor 41 also outputs the sensor signals of the contact force sensor 13 to the image processor 72.

The action controller 42 receives an instructed position xds from the controller 3 through wireless communication and generates a control instruction for operating the robot arm 12 in accordance with the instructed position xds. The action controller 42 outputs the control instruction to the servo motor 15 and operates the robot arm 12 to move the grinding device 11*a* to a position corresponding to the instructed position. At this time, the action controller 42 performs feedback control on an action of the robot arm 12 based on a detection signal of a rotation sensor and/or a current sensor of the servo motor 15 from the input processor 41. The action controller 42 outputs a control instruction to the grinding device 11*a* and works the grinding device 11*a*. Accordingly, the grinding device 11*a* grinds the object W.

The controller 26 of the operation controller 24 reads programs from the storage 27 and develops the programs to the memory 28 to thereby operate various functions. Specifically, the controller 26 functions as an input processor 51 and an action controller 52.

The input processor 51 outputs information, data, instructions, and others received from the operating force sensor 23 to the controller 3. Specifically, the input processor 51 receives detection signals of forces in six axes from the operating force sensor 23 and outputs the detection signals to the controller 3. The input processor 51 receives detection signals of a rotation sensor (e.g., encoder) and a current sensor from the servo motor 25. The input processor 51 outputs the detection signals to the action controller 52 for feedback control of the support 22 by the action controller 52.

The action controller 52 receives an instructed position xdm from the controller 3 and generates a control instruction for operating the support 22 in accordance with the instructed position xdm. The action controller 52 outputs the control instruction to the servo motor 25, operates the support 22, and moves the handle 21 to a position corresponding to the instructed position. At this time, the action controller 52 performs feedback control on an action of the support 22 based on a detection signal of a rotation sensor and/or a current sensor of the servo motor 25 from the input processor 51. Accordingly, a reaction force is exerted against an operating force exerted on the handle 21 by a user. Consequently, the user can operate the handle 21, while sensing a pseudo reaction force of the object W from the handle 21.

The controller 31 of the controller 3 reads programs (specifically, remote control programs) from the storage 32 and develops the programs to the memory 33 to thereby operate various functions. Specifically, the controller 31 functions as an operating force acquirer 61, a contact force acquirer 62, an adder 63, a force-speed converter 64, a first speed-position converter 65, a second speed-position converter 66, a separator 67, a lag detector 68, and a delayer 69.

The controller 73 of the image processor 72 reads programs from the storage 74 and develops the programs to the memory 75 to thereby operate various functions. Specifically, the controller 73 functions as a combiner 77 and an encoder 78.

The controller 83 of the display controller 82 reads programs from the storage 84 and develops the programs to the memory 85 to thereby operate various functions. Specifically, the controller 83 functions as a decoder 87.

The operating force acquirer 61 receives a detection signal of the operating force sensor 23 through the input processor 51, and acquires an operating force fm based on the detection signal. The operating force acquirer 61 inputs the operating force fm to the adder 63.

The contact force acquirer 62 receives sensor signals of the contact force sensor 13 through the input processor 41, and acquires a contact force fs based on the sensor signals. The contact force acquirer 62 inputs the contact force fs to the adder 63. In addition, the contact force acquirer 62 outputs the sensor signals to the lag detector 68.

The adder 63 calculates a sum of the operating force fm input from the operating force acquirer 61 and the contact force fs input from the contact force acquirer 62. In this example, since the operating force fm and the contact force fs are in opposite directions, the operating force fm and the contact force fs have different positive/negative signs. That is, addition of the operating force fm and the contact force fs reduces the absolute value of the operating force fm. The adder 63 outputs a resultant force fm+fs as a sum of the operating force fm and the contact force fs.

The delayer 69 has the function of delaying master-slave control. In this example, the delayer 69 is a low-pass filter, more specifically, a first-order lag filter. The first-order lag filter includes a time constant. The delayer 69 delays an input of the resultant force fm+fs from the adder 63 to the force-speed converter 64 in accordance with the time constant.

The force-speed converter 64 converts the resultant force fm+fs input through the delayer 69 to an instructed speed xd'. The force-speed converter 64 calculates the instructed speed xd' by using a motion model based on an equation of motion including an inertia coefficient, a viscosity coefficient (damper coefficient), and a rigidity coefficient (spring coefficient). Specifically, the force-speed converter 64 calculates the instructed speed xd' based on the equation of motion:

[Eq. 1]

$$md \cdot xd'' + cd \cdot xd' + kd \cdot xd = fm + fs \tag{1}$$

where xd is an instructed position, md is an inertia coefficient, cd is a viscosity coefficient, kd is a rigidity coefficient, fm is an operating force, and fs is a contact force. In the equation, "'" represents one time differentiation, and """ represents two times differentiation.

Equation (1) is a linear differential equation. When Equation (1) is solved for xd', Equation (2) is given.

[Eq. 2]

$$xd' = A \tag{2}$$

where A is a term represented by fm, fs, md, cd, kd, etc.

Equation (2) is stored in the storage 32. The force-speed converter 64 reads Equation (2) from the storage 32 and obtains an instructed speed xd', and outputs the obtained 20 instructed speed xd' to the first speed-position converter 65 and the second speed-position converter 66.

The first speed-position converter 65 converts the instructed speed xd' subjected to coordinate conversion to an instructed position xds for the robot 1 with reference to a robot coordinate system. For example, in a case where a ratio of the amount of movement of the robot to the amount of movement of the operator 2 is set, the first speed-position converter 65 obtains an instructed position xds by multiplying the instructed position xd obtained from the instructed speed xd' in accordance with the movement ratio. The first speed-position converter 65 outputs the obtained instructed position xds to the robot controller 14, specifically, the action controller 42.

The second speed-position converter 66 converts the instructed speed xd' to an instructed position xdm for the operator 2 with reference to the operation coordinate system. The second speed-position converter 66 outputs the obtained instructed position xdm to the operation controller 24, specifically, the action controller 52. As described above, the action controller 52 operates the support 22 based on the instructed position xdm.

The combiner 77 adds, to the captured image of the imager 71, the detection result of the contact force sensor 13 acquired at the timing corresponding to the captured image, as association information indicating that the captured image and the detection result are associated with each other. Specifically, the combiner 77 receives the image signals from the imager 71 and also receives the sensor signals of the contact force sensor 13 through the input processor 41. The combiner 77 adds the sensor signals to the image signals. The combiner 77 combines the sensor signal and the image signal acquired by the contact force sensor 13 and the imager 71 at corresponding timings (i.e., substantially at the same timing). For example, the combiner 77 regards the times when the image signal and the sensor signal are received by the combiner 77 as acquired times of the image signal and the sensor signal, respectively. In this manner, the sensor signal acquired at the timing corresponding to the image signal is added to the image signal as association information indicating that the image signal and the sensor signal are associated with each other.

The sensor signal includes sensor signals of forces in six axes. The combiner 77 adds at least one of the sensor signals of forces in six axes to the image signal. Preferably, the combiner 77 combines the image signal with one of the sensor signals of forces in six axes showing a large variation when the robot 1 applies a treatment to the object W. In this example, since the treatment on the object W is grinding, the combiner 77 combines the image signal with a sensor signal of a force in the Z-axis direction.

At this time, the combiner 77 combines the image signal with the sensor signal by using a digital watermarking technique. Preferably, the combiner 77 embeds the sensor signal in the image signal by an imperceptible digital watermarking.

The encoder 78 encodes the image signal combined with the sensor signal by the combiner 77. The encoder 78 outputs the encoded image signal to the communicator 76. The encoded image signal is transmitted to the display controller 82 through the communicator 76.

The display controller 82 receives an image signal from the image processor 72 through the communicator 86. The image signal is input to the decoder 87. The decoder 87 decodes the image signal. The decoder 87 outputs the decoded image signal to the display monitor 81 and the separator 67 of the controller 3.

The display monitor 81 displays an image in accordance with the decoded image signal.

The separator 67 separates a sensor signal from the decoded image signal. In this example, the image signal is combined with the sensor signal by digital watermarking. The separator 67 separates the sensor signal from the image signal by a digital watermarking technique. The separator 67 outputs the separated sensor signal to the lag detector 68.

The lag detector 68 obtains a delay time as the amount of delay of master-slave control and updates the delay time. The lag detector 68 obtains a delay time based on a time lag between the sensor signal received from the robot 1 and the image signal received from the display 8. The time lag between the sensor signal and the image signal herein is a time lag between times when the sensor signal and the image signal originally acquired at corresponding timings, that is, substantially at the same timing, are received by the lag detector 68, that is, the controller 3. Although the sensor signal and the image signal are originally acquired substantially at the same timing, the transmission paths to the controller 3 and processes to which the signals are subjected in the transmission paths are different, and thus, a lag occurs between the times until these signals reach the controller 3.

The sensor signals received from the robot 1 are used for deriving the instructed position xds and the instructed position xdm. The image signals received from the display monitor 8 are the same signals as the image signals input to the display monitor 81. That is, the time lag between the sensor signal received from the robot 1 and the image signal received from the display 8 corresponds to a lag between the master-slave control and display timing of the captured image by the display 8.

Specifically, the lag detector 68 obtains a time lag between the sensor signal from the contact force acquirer 62 and the sensor signal from the separator 67. The lag detector 68 receives the sensor signals from the contact force acquirer 62 and the sensor signals from the separator 67. The sensor signals from the contact force acquirer 62 are the sensor signals received from the robot controller 14, that is, the robot 1. On the other hand, the sensor signal from the separator 67 is a signal separated from the image signal decoded in the display 8, and is a signal acquired by the contact force sensor 13 at the timing corresponding to the timing when the image signal is acquired by the imager 71. Thus, the time lag between the sensor signal from the contact force acquirer 62 and the sensor signal from the separator 67 corresponds to the time lag between the sensor signal received from the robot 1 and the image signal received from the display 8.

Since the sensor signal added to the image signal by the combiner 77 is a sensor signal of a force in the Z-axis direction whose variation is large in griding among the sensor signals of forces in six axes, the lag detector 68 compares the sensor signal of the force in the Z-axis direction among the sensor signals from the contact force acquirer 62 with the sensor signal from the separator 67.

The lag detector 68 stores the obtained time lags in the storage 32. The time lags are accumulated in the storage 32.

The storage 32 stores a delay time to be used as a reference for determining a time constant of the delayer 69. An initial value of the delay time is set by previously obtaining the time lag as described above. Based on the time lags accumulated in the storage 32, the lag detector 68 updates the delay time. The lag detector 68 updates the delay time based on the time lags if a state where the time lag is significantly different from the delay time continues for a predetermined period or longer.

When the delay time is updated, the lag detector 68 obtains the time constant to be set in the delayer 69, based on the delay time. Specifically, the storage 32 stores a transfer function for transferring the delay time to a time constant. The lag detector 68 obtains a time constant from the delay time by using the transfer function. The lag detector 68 updates the time constant of the delayer 69 to the obtained time constant. The delayer 69 performs the process described above using the updated time constant.

Figure 8:
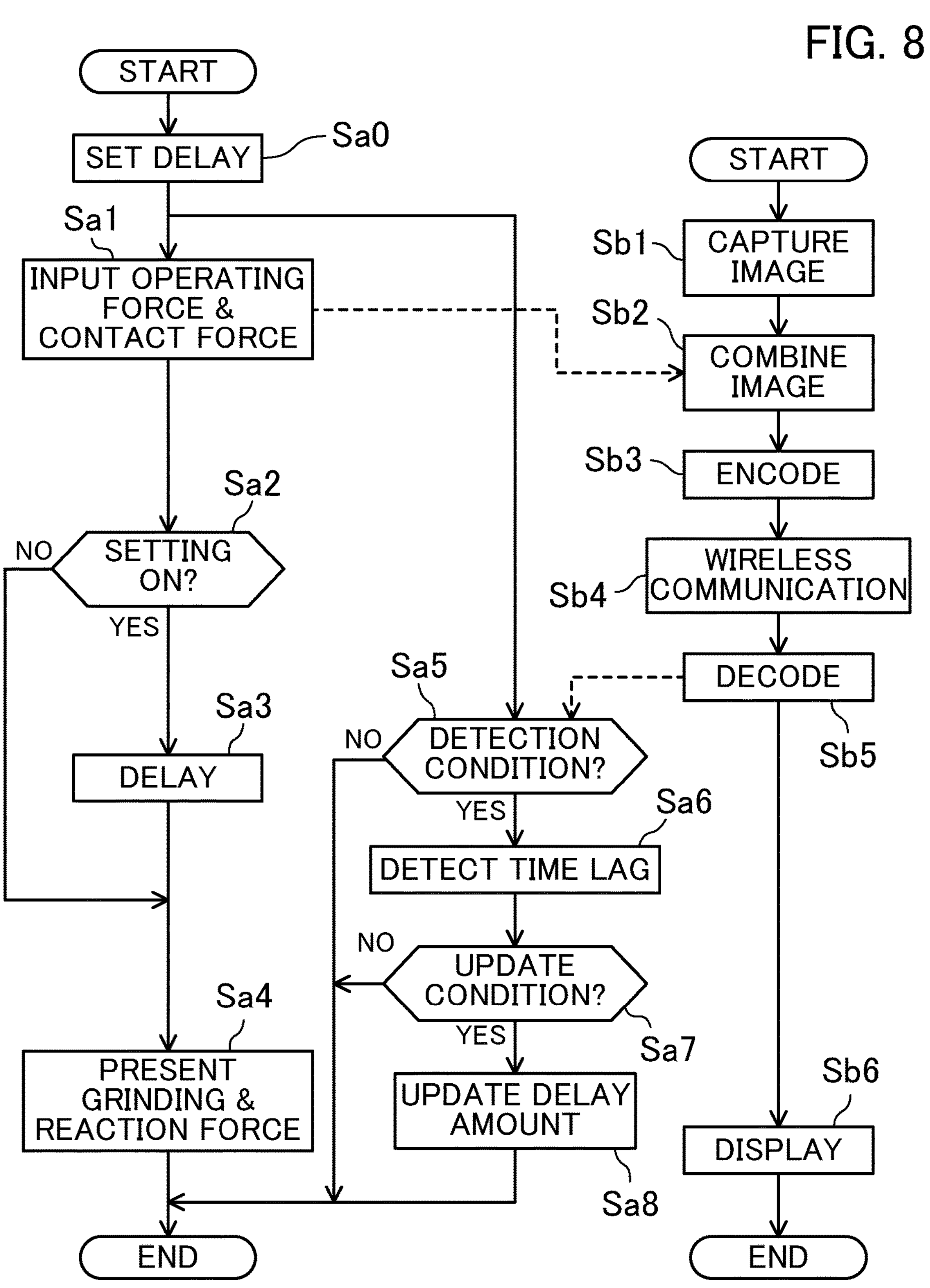
FIG. 8 is a flowchart depicting an action of the remote control system.

Next, an action of the thus-configured remote control system 100 will be described. FIG. 8 is a flowchart depicting an action of the remote control system 100.

[Action of Master-slave System]

Master-slave control by the master-slave system 110 will be described. The master-slave control is achieved such that the controller 3 reads a remote control program stored in the storage 32 and develops the program to the memory 33.

First, in step Sa0, setting delay control is performed. The controller 3 displays a setting screen for performing setting of delay control to the display monitor (not shown). Specifically, the display monitor shows display for switching delay control between valid and invalid, a delay amount (specifically delay time) of master-slave control in the case where the delay control is valid, and so forth. The user sets the delay control through the input operator.

Thereafter, in step Sa1, when the user operates the operator 2, an operating force applied by the user through the handle 21 is detected by the operating force sensor 23. At this time, the contact force sensor 13 of the robot 1 detects a contact force.

The operating force detected by the operating force sensor 23 is input as a detection signal to the controller 3 by the input processor 51. In the controller 3, the operating force acquirer 61 inputs an operating force fm based on the detection signal to the adder 63.

The contact force detected by the contact force sensor 13 is input to the input processor 41 as a sensor signal. The sensor signal input to the input processor 41 is transmitted to the controller 3 through the communicator 19. In addition, the input processor 41 inputs the sensor signal to the image processor 72.

In the controller 3, the communicator 34 receives the sensor signal, and inputs the sensor signal to the contact force acquirer 62. The contact force acquirer 62 inputs a contact force fs based on the sensor signal to the adder 63. In addition, the contact force acquirer 62 inputs the sensor signal to the lag detector 68. The lag detector 68 stores the sensor signal in the memory 33.

Subsequently, in step Sa2, the controller 3 determines whether delay control is valid or not.

If the delay control is invalid, griding by the robot 1 and presentation of a reaction force by the operator 2 are performed in step Sa4. Specifically, the adder 63 obtains a resultant force fm+fs based on the input operating force fm and contact force fs, and inputs the resultant force fm+fs to the force-speed converter 64. At this time, the delayer 69 is regarded as invalid. That is, the resultant force fm+fs output from the adder 63 is input to the force-speed converter 64 without a delay. The force-speed converter 64 obtains an instructed speed xd' based on Equation (2) using the resultant force fm+fs.

Regarding the robot 1, the first speed-position converter 65 obtains an instructed position xds from the instructed speed xd'. The action controller 42 of the robot controller 14 moves the robot arm 12 in accordance with the instructed position xds and controls the position of the grinding device 11*a*. Accordingly, the object W is ground by the grinding device 11*a* with a pressing force in accordance with the operating force fm applied to the object W.

In the operator 2, the second speed-position converter 66 obtains an instructed position xdm from the instructed speed xd'. The action controller 52 of the operation controller 24 operates the support 22 in accordance with the instructed position xdm and controls the position of the handle 21. In this manner, the user senses a reaction force in accordance with a contact force fs.

On the other hand, if the delay control is valid, the master-slave control is delayed in step Sa3. Specifically, based on the set time constant, the delayer 69 delays the input of the resultant force fm+fs from the adder 63 to the force-speed converter 64. Consequently, the time of execution of action control of the robot arm 12 and the handle 21 is delayed from input of the detection signal of the operating force sensor 23 and the sensor signal of the contact force sensor 13.

The master-slave system 110 repeats such a process in a predetermined control cycle. The user operates the operator 2 in the first site S1 to thereby remotely control the robot 1 in the second site S2 and perform griding on the object W. At this time, the user can operate the operator 2 while sensing a reaction force exerted on the grinding device 11*a* from the object W through the operator 2. Step Sa0 is performed only once at the start of this control, and is not performed in subsequent control cycles.

[Action of Image System]

Simultaneously with the control described above, the image system 120 performs image display control in which images of the robot 1 and the object W are captured and the captured images are presented to the user.

First, in step Sb1, the imager 71 captures images of the robot 1 and the object W. The imager 71 captures moving images of the robot 1 and the object W at a predetermined frame rate. The imager 71 inputs the captured images (i.e., image signals) to the image processor 72.

In step Sb2, the combiner 77 of the image processor 72 combines the captured images with the sensor signals of the contact force sensor 13. This combination is not a process for presenting captured images to the user but is a process for updating the delay time of master-slave control.

Specifically, FIG. 9(*i*) shows example of a sensor signal output from the input processor 41. FIG. 9(*ii*) shows an example of an image signal output from the imager 71. FIG. 10 shows an example of an image signal which is output from the combiner 77 and to which a sensor signal is added.

As illustrated in FIG. 9(*i*), the sensor signal output from the input processor 41 includes data acquired in a sampling period corresponding to a control period of master-slave control. On the other hand, as illustrated in FIG. 9(*ii*), the image signal input from the imager 71 includes frames (still images) acquired at a predetermined frame rate. In this example, the sampling period is shorter than the frame rate. In view of this, the combiner 77 combines each frame with a sensor signal acquired in a period between this frame and the preceding frame. The combiner 77 combines an image of each frame with a sensor signal as an image, that is, combines the image with a chronological signal waveform. The combination with the sensor signal is performed by a digital watermarking technique. Consequently, as shown in FIG. 10, an image signal in which the frame is combined with the image of the sensor signal as digital watermarking is generated. The combined frame and sensor signal are acquired substantially at the same timing.

In step Sb3, the encoder 78 encodes the image signal generated by the combiner 77.

Thereafter, in step Sb4, the image processor 72 transmits the encoded image signal to the display controller 82 by wireless communication. The display controller 82 receives the image signal from the image processor 72.

In the display controller 82, the decoder 87 decodes the image signal in step Sb5. The decoder 87 outputs the decoded image signal to the display monitor 81.

In step Sb6, the display monitor 81 displays an image based on the image signal. Accordingly, the captured images of the imager 71 are presented to the user. At this time, the display monitor 81 displays the captured images combined with the sensor signals. It should be noted that the sensor signals are added by an imperceptible digital watermarking technique, and thus, cannot be visually recognized by the user.

The image system 120 repeats such a process at a frame rate of captured images. The imager 71 captures images of the robot 1 and the object W disposed in the second site S2, and the display 8 displays the captured images in the first site S1. In or after operating the operator 2 in the first site S1, the user can confirm the images of the robot 1 and the object W during or after griding in the second site S2 with the display 8 disposed in the first site S1.

[Delay Control]

In the manner described above, in the case where the master-slave control and the image display control are performed simultaneously, the time from acquisition of the captured image by the imager 71 to display of the captured image by the display 8 is longer than the time from acquisition of the sensor signal by the contact force sensor 13 to execution of action control of the robot 1 and the operator 2 by the controller 3 using the sensor signal.

Specifically, in griding the object W by the robot 1, the contact force sensor 13 detects a contact force from the object W as a sensor signal, and the imager 71 acquires captured images of the robot 1 and the object W as captured images. The sensor signal of the contact force sensor 13 is input to the controller 3 through the first transmission path of the master-slave system 110. The controller 3 controls the robot 1 and the operator 2 using the sensor signal as an input, as described above. On the other hand, the image signal of the imager 71 is input to the display 8 through the second transmission path of the image system 120. In the middle of the input, the image signal is encoded in the image processor 72 and decoded in the display controller 82.

The data volume of an image signal is significantly larger than that of a sensor signal. In particular, the difference in data volume further increases for a captured image with high quality. Thus, the communication time of the image signal from the image processor 72 to the display controller 82 is longer than the communication time of the sensor signal from the robot controller 14 to the controller 3. In addition, the image signal needs to be encoded and decoded. An image signal having a larger data volume requires longer times for encoding and decoding.

Consequently, for the sensor signal and the captured image originally acquired substantially at the same timing, the display timing of the captured image by the display display 8 lags behind, specifically, delayed from, the master-slave control using the sensor signal. FIG. 11(*i*) shows an example of a sensor signal acquired by the control device 3 from the robot control device 14. FIG. 11(*ii*) shows an example of an image signal decoded by the display control device 82. As illustrated in FIG. 11(*i*), the sensor signal acquired by the controller 3 is slightly delayed from the sensor signal of the contact force sensor 13 output form the input processor 41 illustrated in FIG. 9(*i*), under the influence of a communication time between the robot controller 14 and the controller 3 and other factors. It should be noted that this delay is negligible. On the other hand, as illustrated in FIG. 11(*ii*), the decoded image signal is delayed from the image signal output from the imager 71 and illustrated in FIG. 9(*ii*), under the influence of the encoding time, the communication time between the image processor 72 and the display controller 82, the decoding time, and so forth. The delay of the image signal is larger than the delay of the sensor signal.

Thus, the user performs grinding by the robot 1 and the operator 2 while observing the captured images of the robot 1 and the object W delayed from those in real time. In addition, the user obtains two types of feedback information: image display by the display 8; and reaction force presentation through the operator 2, in response to operation of the operator 2. However, since a lag occurs between the timings of the reaction force presentation and the image display, the user feels an incongruity sense. Furthermore, a human tends to rely on information by the sense of sight rather than information by the sense of touch. Thus, the user operates the operator 2 based not on presentation of the reaction force by the operator 2 but on the images of the display 8 delayed from those in real time. This tendency increases as the image quality increases. However, as the image quality increases, the delay of image display by the display 8 further increases as described above.

In view of this, in the remote control system 100, the controller 3 delays the master-slave control to reduce a lag between the master-slave control and display timing of the captured images by the display 8. As an example, in step Sa3 of the master-slave control described above, the delayer 69 delays the input of the resultant force fm+fs from the adder 63 to the force-speed converter 64. In this manner, the controller 3 includes a delay element such as the low-pass filter of the delayer 69 when input of the operating force and the contact force to operation of the robot 1 and the operator 2. Accordingly, the controller 3 delays action control of the robot 1 and the operator 2, that is, delays the time from when the sensor signal from the contact force sensor 13 is received to when the robot 1 and the operator 2 are operated.

This means a decrease in responsiveness of the master-slave control. However, responsiveness of image display control (i.e., responsiveness of image display by the display 8 with respect to image shooting by the imager 71) coincides or becomes close to responsiveness of the master-slave control. Even in a case where the user operates the operator 2 based on the captured images displayed by the display 8, an incongruity sense of the user can be reduced. For example, it is possible to prevent grinding on the object W to a degree more than displayed by the display 8.

In particular, for captured images having high quality, the times necessary for encoding the image signal, communicating with the image signal, and decoding the image signal increase. Even in a case where the communication time is reduced by development of communication technology, the times necessary for encoding and decoding the image signal are still long. In addition, with an increase in quality of captured images, the user operating the operator 2 more greatly relies on captured images. Accordingly, the user tends to be more sensitive to a lag between the master-slave control and the display timing of the captured images by the display 8. On the other hand, the remote control system 100 delays the master-slave control so as to reduce the lag between the master-slave control and the display timing of the captured images by the display 8 while allowing a decrease in responsiveness of the master-slave control. As a result, an incongruity sense of the user when the user operates the operator 2 while observing the captured images displayed by the display 8 can be reduced.

[Derivation of Delay Amount]

In addition, while the master-slave control and the image display control as described above are performed, the controller 3 obtains a delay amount of the master-slave control in the delay control.

Specifically, with reference to the flowchart of FIG. 6, in step Sa1, the input processor 41 transmits the sensor signal of the contact force sensor 13 to the controller 3 through the communicator 19, and inputs this sensor signal to the image processor 72. In the image processor 72, in step Sb2, the combiner 77 associates the captured image of the imager 71 and the detection result of the contact force sensor 13 acquired at corresponding timings with each other as described above. Specifically, the image processor 72 adds the sensor signal of the contact force sensor 13 acquired at the timing corresponding to the captured image, to the captured image. More specifically, the combiner 77 combines an image of each frame of the image signal with a sensor signal acquired substantially at the same timing as the frame as an image by a digital watermarking technique.

In the image system 120, the image signal combined with the sensor signal is encoded (step Sb3), subjected to wireless communication (step Sb4), and decoded (step Sb5). Thereafter, the decoded image signal is input not only to the display monitor 81 from the display controller 82 but also to the controller 3 from the display controller 82.

In the master-slave system 110, the separator 67 separates a sensor signal as illustrated FIG. 12 from the decoded image signal as illustrated in FIG. 11(*ii*). In this example, the sensor signal is separated from the image signal based on the digital watermarking technique. The separated sensor signal is input from the separator 67 to the lag detector 68. The lag detector 68 also receives the sensor signal input from the input processor 41 to the controller 3, through the contact force acquirer 62. That is, the lag detector 68 receives the sensor signal of the contact force sensor 13 through two transmission paths of the first transmission path including the robot 1, wireless communication, and the controller 3 and the second transmission path including the image processor 72, wireless communication, and the display controller 82. As described above, the sensor signal transmitted through the second transmission path is subjected to encoding and decoding in the middle of the transmission.

Then, in step Sa5, the lag detector 68 determines whether a predetermined detection condition is established or not. In this example, the detection condition is that the lag detector 68 receives the sensor signal from the separator 67.

Since the control period of master-slave control is shorter than a period corresponding to the frame rate of the image signal, the lag detector 68 receives the sensor signal from the contact force acquirer 62 (i.e., the sensor signal through the first transmission path) in a shorter period than that of the sensor signal from the separator 67 (i.e., the sensor signal through the second transmission path). Thus, if the detection condition is not established, that is, if no sensor signal is input from the separator 67 to the lag detector 68, the lag detector 68 stores the sensor signal input from the contact force acquirer 62 in the memory 33 and finishes derivation of the delay amount in this control period.

If the detection condition is established, that is, if the sensor signal is input from the separator 67 to the lag detector 68, in step Sa6, the lag detector 68 compares the sensor signal from the separator 67 with the sensor signal from the contact force acquirer 62 stored in the memory 33 and obtains a time lag between the sensor signal from the contact force acquirer 62 and the sensor signal from the separator 67.

Specifically, as illustrated in FIG. 12, the lag detector 68 receives a sensor signal from the separator 67 periodically, specifically, at a frame rate of the captured image. The memory 33 stores the sensor signal as illustrated in FIG. 11(*i*). For example, the lag detector 68 searches sensor signals from the contact force acquirer 62 stored in the memory 33 for a signal waveform matching with a signal waveform of the sensor signal from the separator 67. Then, the lag detector 68 obtains, as a time lag, a time difference between the sensor signal from the separator 67 and a portion of the sensor signal from the contact force acquirer 62 whose signal waveform matches with that of the sensor signal from the separator 67. The lag detector 68 stores the obtained time lag in the storage 32.

The lag detector 68 repeats such derivation of the time lag for each establishment of the detection condition. Consequently, time lags are accumulated in the storage 32.

In step Sa7, the lag detector 68 determines whether a predetermined update condition is established or not. For example, the update condition is that a state in which the time lag changes beyond a predetermined variation width (hereinafter referred to as a "variation threshold") with respect to the current delay time continues for a predetermined period (hereinafter referred to as a "period threshold") or more. That is, the update condition is that a state where the time lag is significantly different from the current delay time continues for a given period or more.

Specifically, after obtaining the time lag, the lag detector 68 compares the time lag with the current delay time, determines whether the time difference exceeds the variation threshold or not, and stores the determination result in the storage 32. If the time difference exceeds the variation threshold, the lag detector 68 reads the determination results in a period preceding the present by the period threshold from the storage 32, and determines whether the state where the time difference exceeds the variation threshold continues for the period threshold or more. In a case where positive and negative of the time difference are reversed during the period threshold, this case is not considered as a case where the time difference exceeds the variation threshold continues.

If the state where the time difference exceeds the variation threshold does not continue for the period threshold or more, the lag detector 68 finishes derivation of the delay amount in this current control period.

If the state where the time difference exceeds the variation threshold continues for the period threshold or more, the lag detector 68 averages time lags in this period threshold in step Sa8, and updates the current delay time to the obtained average value. In this example, the delay time corresponds to the delay amount of master-slave control in delay control.

The lag detector 68 obtains a time constant from the updated delay time by using the transfer function stored in the storage 32. The lag detector 68 updates the time constant of the delayer 69 to the obtained time constant.

At this time, the lag detector 68 has a limitation on a variation range of the delay time. That is, the lag detector 68 changes the current delay time to a new delay time stepwise over control periods to prevent an abrupt change of responsiveness of the master-slave control.

In the manner described above, while the master-slave control and the image display control are performed, the remote control system 100 obtains the delay amount of the master-slave control using signals of the master-slave control and the image display control. Specifically, the lag detector 68 of the controller 3 obtains a time lag between the sensor signal received by the controller 3 from the contact force sensor 13 for the master-slave control and the image signal transmitted from the imager 71 to the display 8 and displayed for the image display control, and based on the obtained time lag, obtains a delay amount. Since the delay amount is obtained based on the signals transmitted, received, and processed for the master-slave control and the image display control while the master-slave control and the image display control are performed, the delay amount in conformity with an actual control situation can be obtained. For example, a communication environment between the robot controller 14 and the controller 3 and a communication environment between the image processor 72 and the display controller 82 can change. Even in a case where these communication environments change, the delay amount can be changed in conformity with the change of the communication environments by obtaining the delay amount in the manner described above.

In addition, the times necessary for encoding and decoding can change depending on the images captured by the imager 71. For example, the times necessary for encoding and decoding differ between images with uniform tones and images with various colors and brightnesses. In a grinding process, a spark can occur in a contact portion between the object W and the grinding device 11*a*. That is, the times necessary for encoding and decoding vary depending on whether a spark is included in an image or not or on the amount of the spark. Even in such a case, by obtaining the delay amount in the manner described above, the delay amount can be changed in accordance with the situation of the image.

In addition, the sensor signal and the image signal acquired by the contact force sensor 13 and the imager 71 at corresponding timings are associated with each other so that the controller 3 can distinguish the sensor signal and the image signal associated with each other from the sensor signals used in the master-slave control and the image signals displayed by the display 8, and can obtain a time lag between the sensor signal and the image signal associated with each other.

Specifically, a sensor signal is added to the image signal in the sensor signal and the image signal acquired by the contact force sensor 13 and the imager 71 at corresponding timings, and serves as association information indicating that the sensor signal and the image signal are associated with each other. Based on the sensor signal as the association information, the controller 3 obtains a time lag between the sensor signal and the image signal. That is, when receiving both the signal and the image signal, the controller 3 compares the sensor signal and the sensor signal added to the image signal to thereby distinguish the image signal originally acquired at the timing corresponding to the sensor signal, thereby obtaining a time lag between these signals. In this example, the controller 3 separates the sensor signal from the image signal by the separator 67, and obtains a time lag between the sensor signal from the contact force acquirer 62 and the sensor signal separated from the image signal, as a time lag between the sensor signal and the image signal.

At this time, since the sensor signal is used as the association information, another information does not need to be added to the sensor signal, and it is sufficient to add the sensor signal only to the image signal. In addition, it is unnecessary to prepare information other than the sensor signal and the image signal. Thus, the process is simplified.

Furthermore, in a case where two or more remote control systems 100 are disposed, contamination might occur in wireless communication. Even in such a case, the use of the sensor signal as the association information enables easy determination on whether a combination of the sensor signal and the image signal is appropriate or not (i.e., where contamination occurs or not). For example, in the case of employing an acquisition time as association information and adding acquisition time information to each of the sensor signal and the image signal, identification information for identifying each of the remote control systems 100 needs to be further added to the sensor signal and the image signal. In the case of using the sensor signal as association information, the sensor signal functions as identification information of each of the remote control systems 100. Thus, additional identification information for identifying each of the remote control systems 100 is unnecessary.

In the remote control system 100, addition of the sensor signal to the image signal is performed before encoding of the image signal, and separation of the sensor signal from the image signal is performed after decoding of the image signal. Thus, the sensor signal separated by the separator 67 is delayed by a time spent for encoding of the image signal, wireless communication of the image signal, and decoding of the image signal. Thus, the controller 3 can obtain a time lag appropriately reflecting the influence of encoding, wireless communication, and decoding of the image signal.

In addition, addition of the sensor signal to the image signal is achieved by a digital watermarking technique. Thus, even when the display monitor 8 displays an image signal combined with the sensor signal on the display monitor 81, the sensor signal does not hinder presentation of the captured image to the user. That is, the display 8 does not need a special process such as separation of the sensor signal form the image signal.

In the case where the state where the time lag changes beyond the predetermined variation threshold with respect to the current delay time continues for the predetermined period threshold or more, the controller 3 updates the delay amount, that is, the delay time, of the master-slave control. Accordingly, a small variation of the time lag that is allowed in general master-slave control and image display control can be ignored, and the delay amount of the master-slave control is kept constant so that the master-slave control can be thereby stabilized. That is, the communication environment between the image processor 72 and the display controller 82 is not constant and variations can occur to some degree. The times necessary for encoding and decoding of the image signal can vary depending on the captured image. Thus, in a case where the variation amount of the time lag is small or variation of the time lag is temporary, the controller 3 maintains the delay amount of master-slave control constant to thereby maintain responsiveness of master-slave control constant and avoid an incongruity sense of the user.

In addition, in the case of updating the delay time, the controller 3 changes the delay time stepwise to thereby reduce an incongruity sense of the user. The delay time is directly related to responsiveness of the master-slave control. The controller 3 can prevent an abrupt change of responsiveness of the master-slave control by changing the delay time stepwise.

As described above, the remote control system 100 includes: the operator 2 (master) that is operated by the user; the robot 1 (slave) that applies a treatment to the object W in accordance with an action of the operator 2; the contact force sensor 13 (sensor) that is disposed in the robot 1 and detects an operating state of the robot 1; the imager 71 that captures images of at least one of the robot 1 or the object W; the display 8 that displays the captured images captured by the imager 71 and presents the captured images to the user operating the operator 2; and the controller 3 that performs action control of at least one of the robot 1 or the operator 2 based on detection results of the contact force sensor 13, and the controller 3 delays the action control to reduce a lag between the action control and display timings of the captured images by the display 8.

In other words, the control method for the remote control system 100 including the operator 2 that is operated by the user, the robot that applies a treatment to the object W in accordance with an action of the operator 2, the contact force sensor 13 that is disposed in the robot 1 and detects an operating state of the robot 1, the imager 71 that captures images of at least one of the robot 1 or the object W, and the display that displays the captured images captured by the imager 71 and presents the captured images to the user operating the operator 2, and the method includes: performing action control of at least one of the robot 1 or the operator 2 based on detection results of the contact force sensor 13; and delaying the action control to reduce a lag between the action control and display timings of the captured images b the display 8.

A remote control program for causing a computer to execute the function of controlling the remote control system 100 including the operator 2 that is operated by the user, the robot 1 that applies a treatment to the object W in accordance with an action of the operator 2, the contact force sensor 13 that is disposed in the robot 1 and detects an operating state of the robot 1, the imager 71 that captures images of at least one of the robot 1 or the object W, and the display 8 that displays the captured images captured by the imager 71 and presents the captured images to the user operating the operator 2, and the remote control program causes the computer to execute the functions of: performing action control of at least one of the robot 1 or the operator 2 based on detection results of the contact force sensor 13; and delaying the action control to reduce a lag between the action control and display timings of the captured images by the display 8.

In these configurations, the user operates the operator 2 so that the robot 1 moves and applies a treatment (e.g., grinding) to the object W. At this time, the contact force sensor 13 detects an operating state of the robot 1 (e.g., reaction force against the robot 1). Based on the detection result of the contact force sensor 13, action control of at least one of the robot 1 or the operator 2 is performed. Simultaneously, the imager 71 captures an image of at least one of the robot 1 and the object W, and the display 8 displays this captured image and presents the captured image to the user. Here, the data volume of the captured image is larger than the detection result of the contact force sensor 13. Thus, the time necessary for processing and communication from acquisition of the captured image by the imager 71 to display of the captured image by the display 8 is longer than the time necessary for processing and communication from acquisition of the detection result by the contact force sensor 13 to use of the detection result for action control. That is, the display timing of the captured image by the display 8 tends to lag behind (specifically delayed from) action control of at least one of the robot 1 or the operator 2 based on the detection result of the contact force sensor 13. On the other hand, action control is delayed so as to reduce a lag between the action control and display timing of the captured image by the display 8. Accordingly, although responsiveness of action control decreases, the user operating the operator 2 while observing the captured image of the display 8 less feels an incongruity sense.

The controller 3 receives the detection results of the contact force sensor 13 from the robot 1 and receives the captured images from the display 8, and obtains the delay amount in delaying action control based on the time lag between the detection results of the contact force sensor 13 and the captured images.

With this configuration, the controller 3 receives the detection result of the contact force sensor 13 from the robot 1, and based on this detection result, performs action control. On the other hand, the controller 3 receives the captured image from the display 8, and this captured image is displayed by the display 8. That is, the time lag between the detection result of the contact force sensor 13 and the captured image received by the controller 3 substantially matches with the time lag between the action control and display of the captured image by the display 8. Thus, the controller 3 obtains the delay amount of the action control based on the time lag between the detection result of the contact force sensor 13 and the captured image to thereby obtain the delay amount of the action control corresponding to a lag between the action control and display of the captured image by the display 8.

In addition, association information is added to at least one of the detection result or the captured image acquired by the contact force sensor 13 and the imager 71, respectively, at corresponding timings, the association information indicating that the detection result and the captured image, and the controller 3 distinguishes the detection result and the captured image acquired at the corresponding tings based on the association information from the detection results and the captured images received by the controller 3, and obtains the time lag.

With this configuration, the controller 3 can easily distinguish the detection result and the captured image acquired at corresponding tings from the detection results and the captured images by referring to the association information.

The remote control system 100 further includes the image processor 72 that receives the captured images from the imager 71, processes the captured images, and transmits the processed captured images to the display 8, the image processor 72 receives the detection results from the robot 1, adds, as the association information, the detection result acquired at the timing corresponding to the captured image to the captured image, and transmits the captured image to which the detection result is added, to the display 8, and the controller 3 receives the captured image to which the detection result is added from the display 8, and obtains the time lag based on a comparison between the detection result added to the captured image and the detection result received from the robot 1.

With this configuration, the detection result of the contact force sensor 13 is added to the captured image in the detection result of the contact force sensor 13 and the captured image of the imager 71 acquired at corresponding timings, and serves as association information indicating that the detection result and the captured image are associated with each other. Thus, the detection result is added to the captured image transmitted to the display 8 and received by the controller 3 from the display 8. The controller 3 receives the detection result from the robot 1. The time lag between the detection result received from the robot 1 and the captured image to which the detection result is added is the time lag between the detection result and the captured image. Thus, the controller 3 compares the detection result added to the captured image and the detection result received from the robot 1 to thereby easily obtain the time lag between the detection result and the captured image.

The image processor 72 combines the captured image with the detection result acquired at the timing corresponding to the captured image as an image to thereby add the detection result to the captured image, encodes the captured image to which the detection result is added, and transmits the encoded captured image to the display 8, and the controller 3 acquires the detection results from which the acquired images decoded by the display 8.

With this configuration, the detection result of the contact force sensor 13 added to the captured image received by the controller 3 from the display 8 is transmitted through encoding, communication between the image processor 72 and the display 8, and decoding, together with the captured image. That is, the controller 3 obtains the time lag based on the comparison between the detection result added to the decoded captured image and the detection result received from the robot 1 to thereby obtain a time lag reflecting a delay caused by these processes and the communication.

As the action control, the controller 3 controls an action of the robot 1 and controls an action of the operator 2 such that a reaction force exerted on the robot 1 is presented to the user, in accordance with operation of the operator 2 by the user and the detection results.

With this configuration, the action control of the controller 3 includes control of an action of the robot 1 and control of an action of the operator 2. That is, when a lag between the action control and the display timing of the captured image by the display 8 occurs, a lag occurs between control of the action of the robot 1 and the display timing of the captured image by the display 8, and a lag also occurs between control of the action of the operator 2 and the display timing of the captured image by the display 8. For example, when the display timing of the captured image by the display 8 is delayed from control of the action of the robot 1, the user operates the operator 2 while observing the captured images of the action of the robot 1 or the object W delayed from an actual action of the robot 1. When the display timing of the captured image by the display 8 is delayed from control of the action of the operator 2, the user senses a reaction force from the operator 2 while observing the captured images of the action of the robot 1 or the object W delayed from an action of the robot 1 when receiving a reaction force presented from the operator 2. In either case, the user feels an incongruity sense. On the other hand, since the controller 3 delays the action control, control of the action of the robot 1 and control of the action of the operator 2 are both delayed. As a result, while the user operates the operator 2 while observing the captured images of the display 8, a lag between the action of the robot 1 and the captured images and a lag between the reaction force sensed from the operator 2 and the captured images can be reduced.

The contact force sensor 13 is an example of a sensor that detects an operating state of the robot 1, and is an example of a force sensor.

Other Embodiments

In the foregoing description, the embodiments have been described as an example of the technique disclosed in the present application. The technique disclosed here, however, is not limited to these embodiments, and is applicable to other embodiments obtained by changes, replacements, additions, and/or omissions as necessary. Components described in the above embodiments may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

The configuration of the remote control system 100 described above is merely an example, and is not restrictive. For example, regarding the master-slave system 110, a treatment applied to the object W by the robot 1 is not limited to grinding. The treatment applied to the object W by the robot 1 may be cutting, polishing, or other treatments, or may be pressing, holding, or other treatments.

The remote control system 100 includes the operator 2, the display 8, and the controller 3, and may not include the robot 1, the contact force sensor 13, and the imager 71. For example, the remote control system 100 including the operator 2, the display 8, and the controller 3 may be disposed in a first country with the robot 1 and the imager 71 disposed in a second country different from the first country. In this case, a user operates the operator 2 while observing the display 8 in the first country to thereby move the robot 1 disposed in the second country. Control of the controller 3 is the same as that described above.

Specifically, the remote control system 100 includes: the operator 2 (master) that is operated by a user in order to move the robot 1 (slave) that applies a treatment to an object W; the display 8 that displays captured images captured by the imager 71 that captures images of at least one of the robot 1 or the object W, and presents the captured images to the user operating the operator 2; and the controller 3 that performs action control of at least one of the operator 2 or the robot 1 based on detection results of the contact force sensor 13 (sensor) that is disposed in the robot 1 and detects an operating state of the robot 1, and the controller 2 delays the action control to reduce a lag between the action control and display timings of the captured images by the display 8.

With this configuration, even in a case where the robot 1 and the operator 2 are disposed in different countries, it is possible to operate the robot 1 remotely with the operator 2 while observing the display 8. In addition, the user operating the operator 2 while observing the captured images of the display 8 less feels an incongruity sense.

Communication between the robot 1 and the controller 3 is not limited to wireless communication, and may be wired communication. Similarly, communication between the imager 71 and the display 8 is not limited to wireless communication and may be wired communication.

Action control of the robot 1 and the operator 2 by the controller 3 is not limited to bilateral control. For example, the controller 3 may perform action control of the robot in accordance with an action of the operator 2 and action control of the operator 2 in accordance with a reaction force exerted on the robot 1 from the object W independently of each other.

Alternatively, the controller 3 may perform only action control of the robot 1 in accordance with an action of the operator 2 without performing presentation of a reaction force to the user through the operator 2. That is, the controller 3 may perform only action control of the robot 1 based on operation of the operator 2 by the user and the sensor signal of the contact force sensor 13.

The robot 1 is not limited to an industrial robot. For example, the robot 1 is a medical robot. The slave is not limited to a robot. For example, the slave may be a machine such as a construction machine.

The sensor that detects an operating state of the slave is not limited to the contact force sensor 13, and may be any sensor as long as the sensor can detect the operating state of the slave. For example, in a case where the slave is the robot 1, the sensor that detects the operating state of the slave may be a current sensor that detects a current of the servo motor 15 or a torque sensor that detects a torque of the servo motor 15, for example.

The sensor signal added to the captured image is not limited to the sensor signal of the force in the Z-axis direction. The sensor signal added to the captured image may be a sensor signal of a force in a direction other than the Z-axis direction, and may include a sensor signal of forces in directions not limited to the Z-axis direction. For example, in step Sa0 or other steps, the user may select a sensor signal added to the captured image from sensor signals of forces in six axes. Alternatively, the robot controller 14 or the image processor 72 may select a sensor signal to be added to the captured image from sensor signals of forces in six axes. For example, the robot controller 14 or the image processor 72 may select a sensor signal showing a large variation from the sensor signals of forces in six axes of the contact force sensor 13.

Addition of the sensor signal to the captured image is not limited to addition by an imperceptible digital watermarking technique. For example, the sensor signal may be added to the captured image in a visible state. The addition of the sensor signal in a visible state may be achieved by a perceptible digital watermarking technique or by other techniques.

In the example described above, the sensor signal added to each frame of the image signal includes multiple pieces of numerical data, and has a signal waveform that can be distinguished from sensor signals added to the other frames. However, depending on some sampling periods of the sensor signal and some frame rates of the image signal, the sensor signal added to each frame of the image signal has data of a small numerical value and cannot have a signal waveform that can be distinguished from the sensor signals added to other frames in some cases. In such cases, the lag detector 68 may merge the sensor signal added to the frame as a target of deriving the time lag with a sensor signal(s) added to a preceding one or more frames to thereby have a distinguishable signal waveform and compare the merged sensor signal with the sensor signal from the contact force acquirer 62.

The association information indicating that the detection result of the sensor and the captured image of the imager acquired at corresponding timings are associated with each other is not limited to the detection result of the sensor (sensor signal of the contact force sensor 13 in the example described above). For example, the association information may be time information. Specifically, time information of a time when the detection result of the sensor is acquired may be added to this detection result, and time information of a time when the captured image of the imager is acquired may be added to this captured image. In this case, the detection result of the sensor does not need to be added to the image signal. For example, the robot controller 14 may add, to the sensor signal of the contact force sensor 13, time information indicating a time when this sensor signal is acquired, and the image processor 72 may add, to the image signal of the imager 71, time information indicating a time when this image signal is acquired. Then, the sensor signal does not need to be input from the robot controller 14 to the image processor 72. The lag detector 68 compares the time signal added to the sensor signal with the time signal added to the image signal to thereby distinguish the sensor signal and the image signal acquired at corresponding timings and obtain a time lag between these signals. The addition of time information to the image signal may be performed by adding the time information as data or by combining the captured image with the time information as an image. The association information may be identification information indicating an acquisition timing, other than time information.

The update condition of the delay time is not limited to the condition that the state where the time lag changes beyond the predetermined variation width with respect to the current delay time continues for the predetermined period or more. For example, the update condition may be a condition that the time lag changes beyond the predetermined variation width with respect to the current delay time. Alternatively, the update condition may be arrival of a predetermined period, irrespective of a variation of the time lag. That is, the delay time may be updated in every predetermined period.

In updating the delay time based on the condition that the state where the time lag changes beyond the predetermined variation width with respect to the current delay time continues for the predetermined period or more, the new delay time may not be an average of time lags in the predetermined period. For example, the new delay time may be a latest time lag, or a time lag that most frequently appears in the predetermined period.

In updating the delay time, the current delay time may not be updated stepwise but may be updated at once, to the new delay time.

The update of the delay time may not be automatically performed by the controller 3 but may be performed such that when the update condition is satisfied, a new delay time is presented to the user and the delay time is updated by user's operation.

The block diagram described above is an example, and blocks may be implemented as one block, one block may be divided into blocks, or some functions may be transferred to another block.

The technique disclosed here may be a program for executing the control method, and may be a non-transitory computer-readable recording medium in which the program is recorded. The program may be distributed via a transmission medium such as the Internet.

Functions of the configuration disclosed in this embodiment may be performed by using an electric circuit or a processing circuit. A processor is, for example, a processing circuit including a transistor and other circuits. In this disclosure, a unit, a controller, or a means is hardware or is programmed to perform the described functions. The hardware therein is hardware disclosed in this embodiment or known hardware configured or programmed to perform functions disclosed in this embodiment. In a case where the hardware is a processor or a controller, a circuit, a means, or a unit is a combination of hardware and software, and the software is used for configuring hardware and/or a processor.

What is claimed is:

1. A remote control system comprising:

a master that is operated by a user;

a slave that applies a treatment to an object in accordance with an action of the master;

a sensor that is disposed in the slave and detects an operating state of the slave;

an imager that captures images of at least one of the slave and the object;

a display that displays the captured images captured by the imager and presents the captured images to the user operating the master;

a controller that performs action control of at least one of the master and the slave based on detection results of the sensor, wherein the controller delays the action control to reduce a lag between the action control and display timings of the captured images by the display, and the controller receives each detection result from the slave, receives each captured image from the display, and obtains a delay amount in delaying the action control based on a time lag between each detection result and each corresponding captured image by matching a signal waveform of each captured image with a signal waveform of a corresponding detection result; and an image processor that receives the captured images from the imager and combines each captured image with each respective detection result to generate a combined image signal, wherein the image processor encodes the combined image signal as an encoded image signal and transmits the encoded image signal to the controller, the controller decodes the encoded image signal and outputs the decoded image signal to the display such that the display displays the captured images combined with the respective detection results, and the display displays each captured image together with a sensor signal waveform of each detection result.

2. The remote control system according to claim 1, wherein in a case where the controller updates the delay amount to a new delay amount obtained based on the time lag, the controller updates the delay amount to the new delay amount stepwise.

3. The remote control system according to claim 1, wherein association information is added to at least one of the detection result and the captured image acquired by the sensor and the imager, respectively, at corresponding timings, the association information indicating that the detection result and the captured image are associated with each other, and the controller distinguishes the detection result and the captured image acquired at the corresponding timings based on the association information from the detection results and the captured images received by the controller, and obtains the time lag.

4. The remote control system according to claim 3, wherein the image processor receives the detection results from the slave, adds, as the association information, the detection result acquired at the timing corresponding to the captured image to the captured image to generate the combined image signal, and transmits the encoded image signal to the controller, and the controller obtains the time lag based on a comparison between the detection result added to the captured image and the detection result received from the slave.

5. The remote control system according to claim 1, wherein as the action control, the controller controls an action of the slave and controls an action of the master such that a reaction force exerted on the slave is presented to the user, in accordance with operation of the master by the user and the detection results.

6. The remote control system according to claim 5, wherein the sensor is a force sensor.

7. The remote control system according to claim 1, wherein the corresponding detection result is stored in a memory which the controller searches in order to match the signal waveforms.

8. A remote control system comprising:

a master that is operated by a user in order to move a slave that applies a treatment to an object;

a display that displays captured images captured by an imager that captures images of at least one of the slave and the object, and presents the captured images to the user operating the master;

a controller that performs action control of at least one of the master and the slave based on detection results of a sensor that is disposed in the slave and detects an operating state of the slave, wherein the controller delays the action control to reduce a lag between the action control and display timings of the captured images by the display, and the controller receives each detection result from the slave, receives each captured image from the display, and obtains a delay amount in delaying the action control based on a time lag between each detection result and each corresponding captured image by matching a signal waveform of each captured image with a signal waveform of a corresponding detection result; and an image processor that receives the captured images from the imager and combines each captured image with each respective detection result to generate a combined image signal, wherein the image processor encodes the combined image signal as an encoded image signal and transmits the encoded image signal to the controller, the controller decodes the encoded image signal and outputs the decoded image signal to the display such that the display displays the captured images combined with the respective detection results, and the display displays each captured image together with a sensor signal waveform of each detection result.

9. The remote control system according to claim 8, wherein the corresponding detection result is stored in a memory which the controller searches in order to match the signal waveforms.

10. A control method for a remote control system including a master that is operated by a user, a slave that applies a treatment to an object in accordance with an action of the master, a sensor that is disposed in the slave and detects an operating state of the slave, an imager that captures images of at least one of the slave and the object, and a display that displays the captured images captured by the imager and presents the captured images to the user operating the master, the method comprising:

performing action control of at least one of the master and the slave based on detection results of the sensor;

delaying the action control to reduce a lag between the action control and display timings of the captured images by the display, wherein each detection result is received from the slave, each captured image is received from the display, and a delay amount in delaying the action control is obtained based on a time lag between each detection result and each corresponding captured image by matching a signal waveform of each captured image with a signal waveform of a corresponding detection result;

receiving the captured images from the imager and combining each captured image with each respective detection result to generate a combined image signal;

encoding the combined image signal as an encoded image signal and transmitting the encoded image signal; and decoding the encoded image signal and outputting the decoded image signal to the display such that the display displays the captured images combined with the respective detection results, wherein the display displays each captured image together with a sensor signal waveform of each detection result.

11. The control method according to claim 10, wherein the corresponding detection result is stored in a memory which is searched in order to match the signal waveforms.

12. A non-transitory recording medium recording a remote control program for causing a computer to execute the function of controlling a remote control system including a master that is operated by a user, a slave that applies a treatment to an object in accordance with an action of the master, a sensor that is disposed in the slave and detects an operating state of the slave, an imager that captures images of at least one of the slave and the object, and a display that displays the captured images captured by the imager and presents the captured images to the user operating the master, the program causing the computer to execute the functions of:

performing action control of at least one of the master and the slave based on detection results of the sensor;

delaying the action control to reduce a lag between the action control and display timings of the captured images by the display, wherein each detection result is received from the slave, each captured image is received from the display, and a delay amount in delaying the action control is obtained based on a time lag between each detection result and each corresponding captured image by matching a signal waveform of each captured image with a signal waveform of a corresponding detection result;

receiving the captured images from the imager and combining each captured image with each respective detection result to generate a combined image signal;

encoding the combined image signal as an encoded image signal and transmitting the encoded image signal; and decoding the encoded image signal and outputting the decoded image signal to the display such that the display displays the captured images combined with the respective detection results, wherein the display displays each captured image together with a sensor signal waveform of each detection result.

13. The non-transitory recording medium according to claim 12, wherein the corresponding detection result is stored in a memory which is searched in order to match the signal waveforms.

* * * * *